United States Patent
Huang et al.

(10) Patent No.: US 7,682,159 B2
(45) Date of Patent: Mar. 23, 2010

(54) ELECTRICAL CONNECTOR AND CAMERA DEVICE HAVING THE SAME

(75) Inventors: Ssu-Han Huang, Taipei Hsien (TW); Chun-Fang Cheng, Taipei Hsien (TW); Fu-Yen Tseng, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 299 days.

(21) Appl. No.: 11/862,518

(22) Filed: Sep. 27, 2007

(65) Prior Publication Data

US 2008/0267617 A1 Oct. 30, 2008

(30) Foreign Application Priority Data

Apr. 27, 2007 (CN) .................... 2007 1 0200526

(51) Int. Cl.
*H01R 12/00* (2006.01)
(52) U.S. Cl. .................................. 439/71; 439/607.01
(58) Field of Classification Search .................. 439/71, 439/607.35, 70, 607.01
See application file for complete search history.

(56) References Cited

U.S. PATENT DOCUMENTS

| | | | | |
|---|---|---|---|---|
| 4,433,886 | A * | 2/1984 | Cassarly et al. | 439/65 |
| 6,862,804 | B2 * | 3/2005 | Nishio et al. | 29/840 |
| 7,121,864 | B1 | 10/2006 | Yang | |
| 7,281,954 | B1 * | 10/2007 | Hashiguchi et al. | 439/660 |
| 7,422,482 | B2 * | 9/2008 | Wang | 439/607.01 |
| 7,435,139 | B2 * | 10/2008 | Yang | 439/607.01 |
| 7,534,140 | B2 * | 5/2009 | Zheng et al. | 439/607.01 |
| 7,556,504 | B2 * | 7/2009 | Ryu | 439/70 |
| 2006/0189183 | A1 | 8/2006 | Yang | |

* cited by examiner

*Primary Examiner*—Gary F. Paumen
(74) *Attorney, Agent, or Firm*—Zhigang Ma

(57) ABSTRACT

An electrical connector for electrical connecting a camera module with a circuit board includes an insulative casing and a number of signal terminals. The insulative casing includes a bottom wall and a number of side walls. A receiving space is defined between the bottom wall and side walls for receiving the camera module. The bottom wall defines a receiving opening thereon. The signal terminals are fixed on the side walls and extending beyond the bottom wall configured for electrically connecting with the camera module and the circuit board. The present invention also relates to a camera device having the same.

9 Claims, 5 Drawing Sheets

ELECTRICAL CONNECTOR AND CAMERA DEVICE HAVING THE SAME

BACKGROUND

1. Technical Field

The present invention relates to electrical connectors, and more particularly, to an electrical connector for receiving a camera module therein to connect the camera module electrically with a circuit board and a camera device having the same.

2. Description of Related Art

With the development of the optical imaging technology, camera devices are becoming widely used in electronic devices such as digital cameras and mobile phones.

FIG. 4 shows an electrical connector 100a configured (i.e., structured and arranged) for receiving a camera module therein to connect the camera module electrically with a circuit board according to a related article of technology. The electrical connector 100a includes a metallic housing 10a, an insulative casing 20a and a number of signal terminals 30a. The metallic housing 10a shields the insulative casing 20a from electro-magnetic interference (EMI). The insulative casing 20a includes a bottom wall 21a and four side walls 22a which together define a receiving space for receiving a camera module. The signal terminals 30a are fixed respectively on four side walls 22a of the insulative casing 20a. Each signal terminal 30a has a contact portion 31a at one end and a bonding portion 32a at the other end. The contact portion 31a extends into the receiving space for electrically connecting with the camera module received therein and the bonding portion 32a extends outside of the insulative casing 20a for bonding to a circuit board.

Referring to FIG. 5, a camera module usually has a base board 2a for an image sensor 1a mounted thereon. The base board 2a has wires disposed therein and is electrically connected with the image sensor 1a. The base board 2a can contact with the contact portion 31a of the signal terminal 30a for output signals from the image sensor 1a by electrical connection points disposed on its side or bottom outer surface. As well as the image sensor 1a, the base board 2a also has other electronic elements 3a, such as resistors and capacitors, mounted thereon.

As a result of miniaturization, when the camera module is inserted into the electrical connector 100a, the distance between the bottom outer surface of the base board 2a and the bottom wall 21a of the insulative casing 20a can be too small to receive electronic elements 3a mounted on the base board 2a. So, both the electronic elements 3a and the image sensor 1a have to be mounted on a surface of the base board 2a facing an object side of camera module. Accordingly, the base board 2a needs to have a relatively large size.

What is needed, therefore, is an electrical connector and a camera device capable of miniaturization.

SUMMARY

In accordance with one embodiment, an electrical connector for electrical connecting a camera module and a circuit board includes an insulative casing and a number of signal terminals. The insulative casing includes a bottom wall and a number of side walls. A receiving space is defined between the bottom wall and side walls for receiving the camera module. The bottom wall defines a receiving groove thereon. The signal terminals are fixed on the side walls and extending beyond the bottom wall configured for electrically connecting with the camera module and the circuit board.

In accordance with one embodiment, a camera device includes a circuit board, a camera module and an electrical connector. The camera module has a substrate at the bottom of the camera module, at least one electronic element is mounted on a surface of the substrate facing away from an object side of the camera module. The electrical connector is mounted on the circuit board for receiving the camera module therein. The electrical connector includes an insulative casing and a number of signal terminals. The insulative casing includes a bottom wall and a number of side walls. A receiving space is defined between the bottom wall and side walls for receiving the camera module. The bottom wall defines a receiving groove thereon for receiving the electronic element mounted on the surface of the substrate facing away from the object side of the camera module. The signal terminals are fixed on the side walls and extend beyond the bottom wall configured for electrically connecting with the camera module and the circuit board.

BRIEF DESCRIPTION OF THE DRAWING

Many aspects of the present camera device can be better understood with reference to the following drawings. The components in the drawing are not necessarily drawn to scale, the emphasis instead being placed upon clearly illustrating the principles of the present camera device. Moreover, in the drawing, like reference numerals designate corresponding parts throughout the several views.

DETAILED DESCRIPTION OF THE EMBODIMENTS

Embodiments will now be described in detail below with reference to the drawings.

Figure 1:
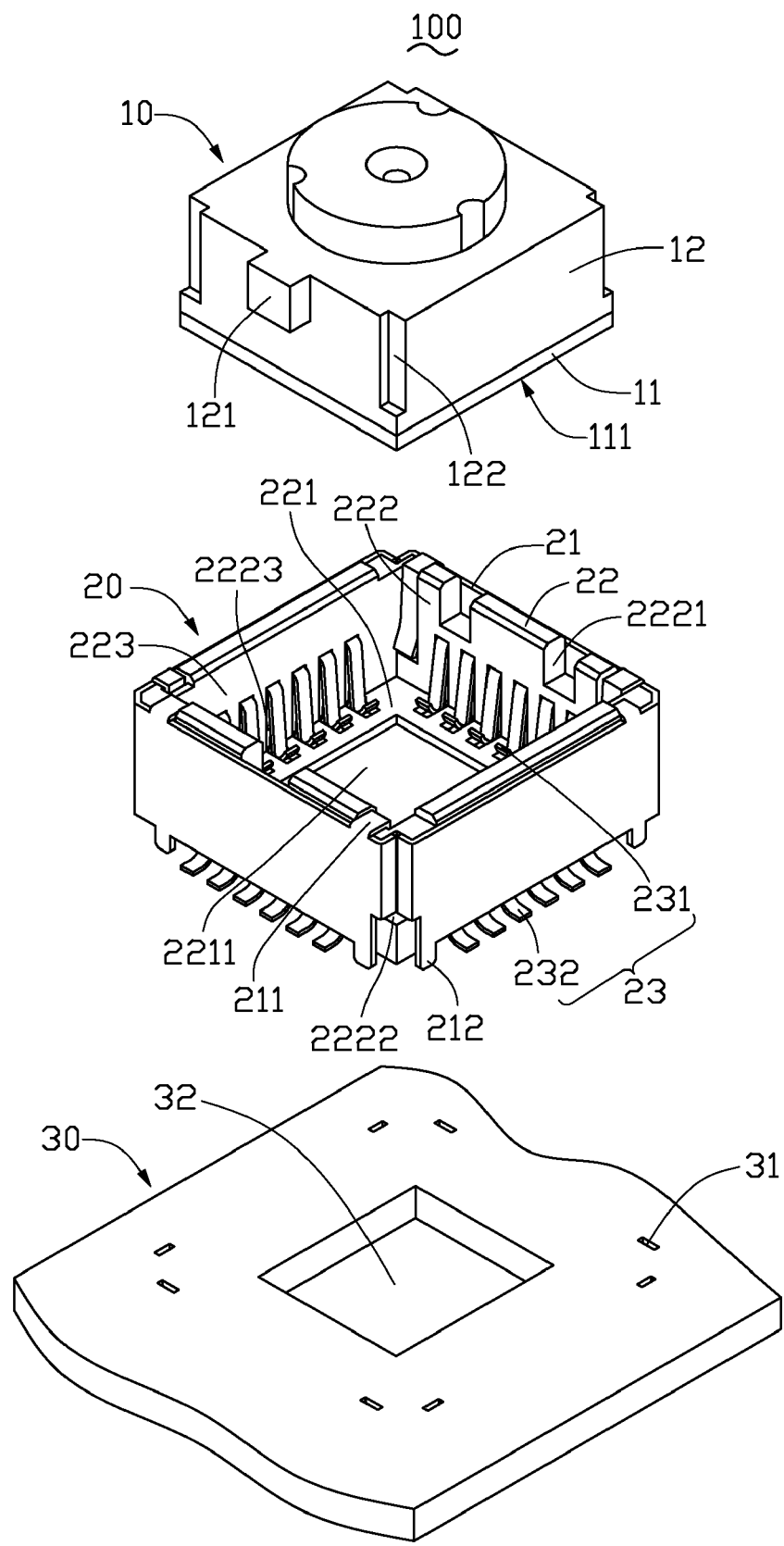
FIG. 1 is a schematic, exploded view of a camera device according to an embodiment.
Figure 2:
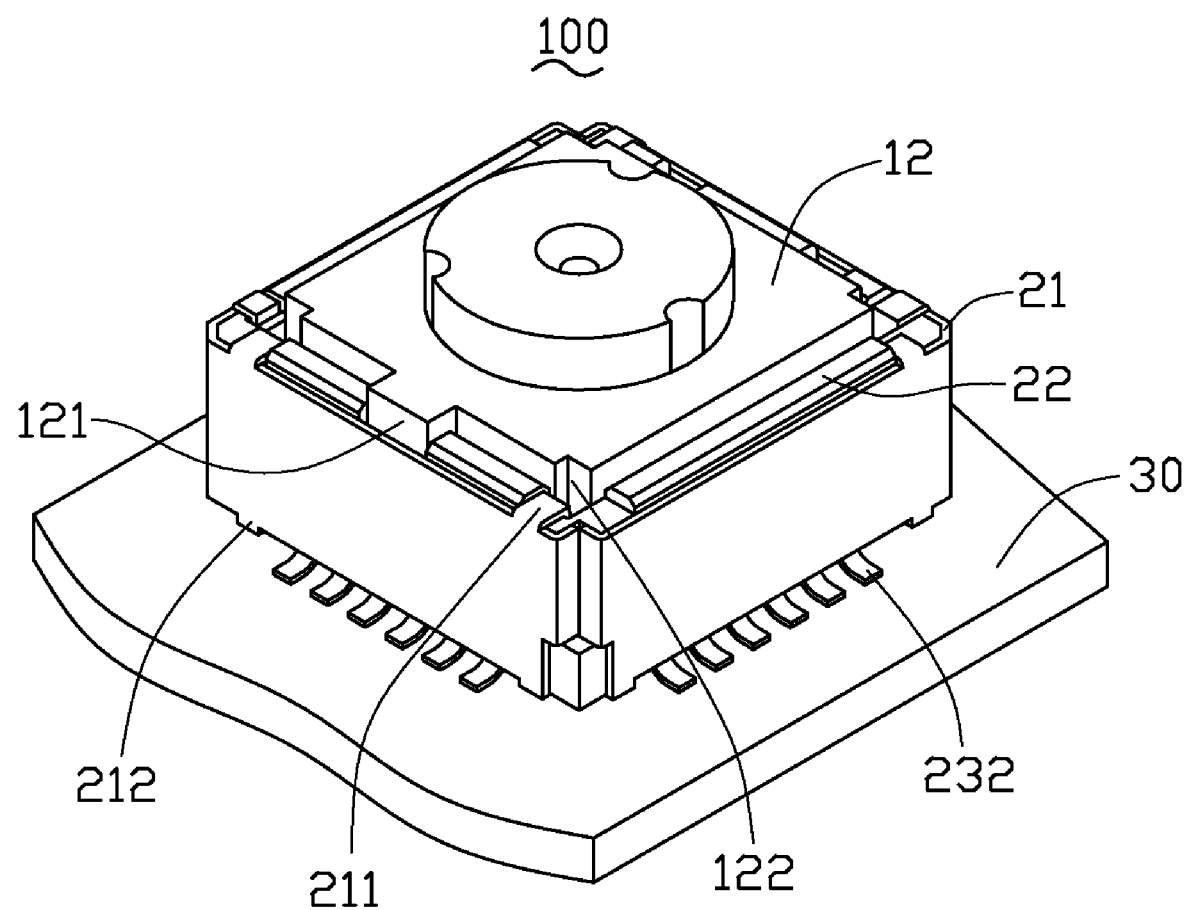
FIG. 2 is a schematic overhead view of the camera device of FIG. 1 after assembly.
Figure 3:
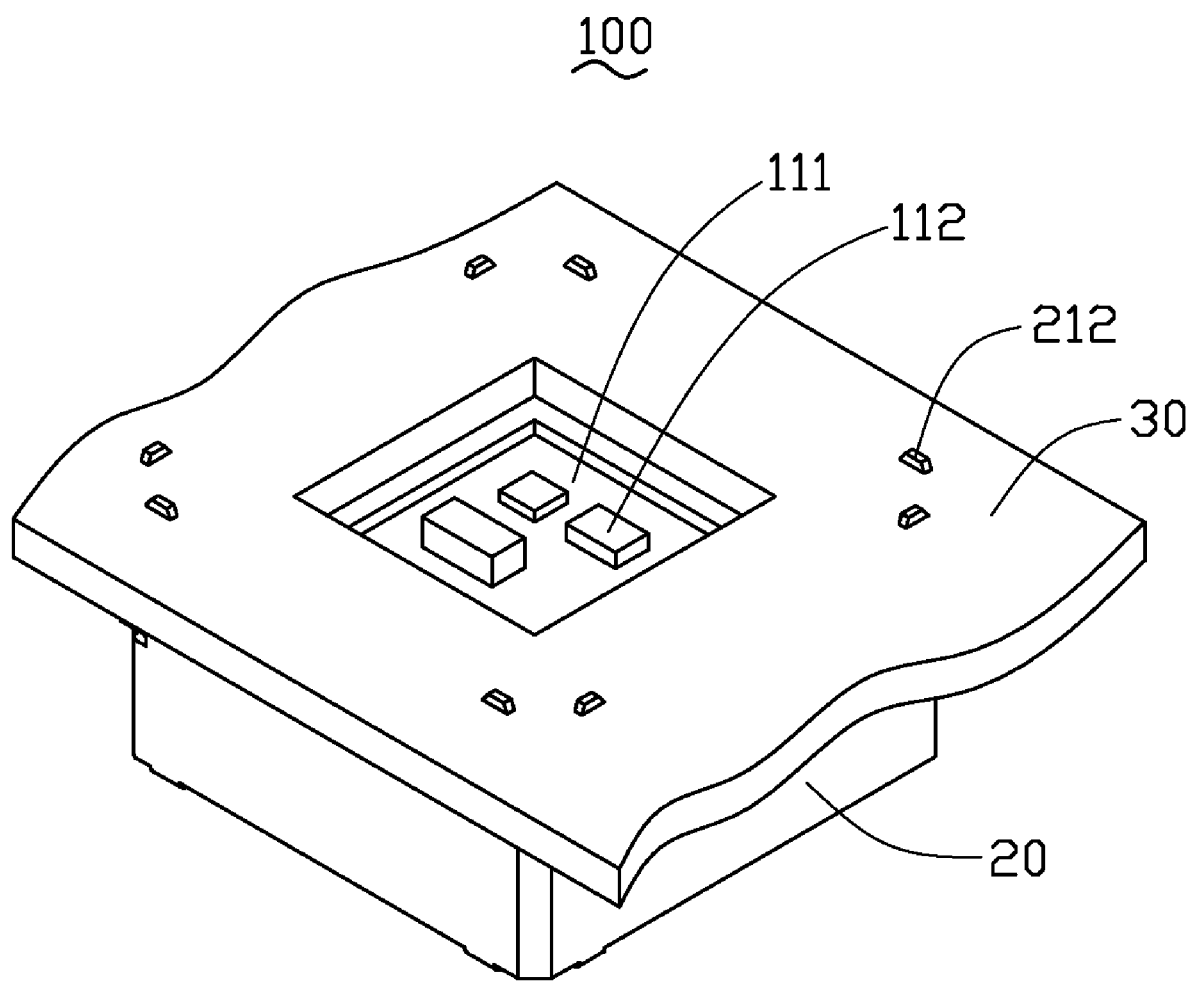
FIG. 3 is a schematic bottom view of the camera device of FIG. 1 after assembly.
Figure 4:
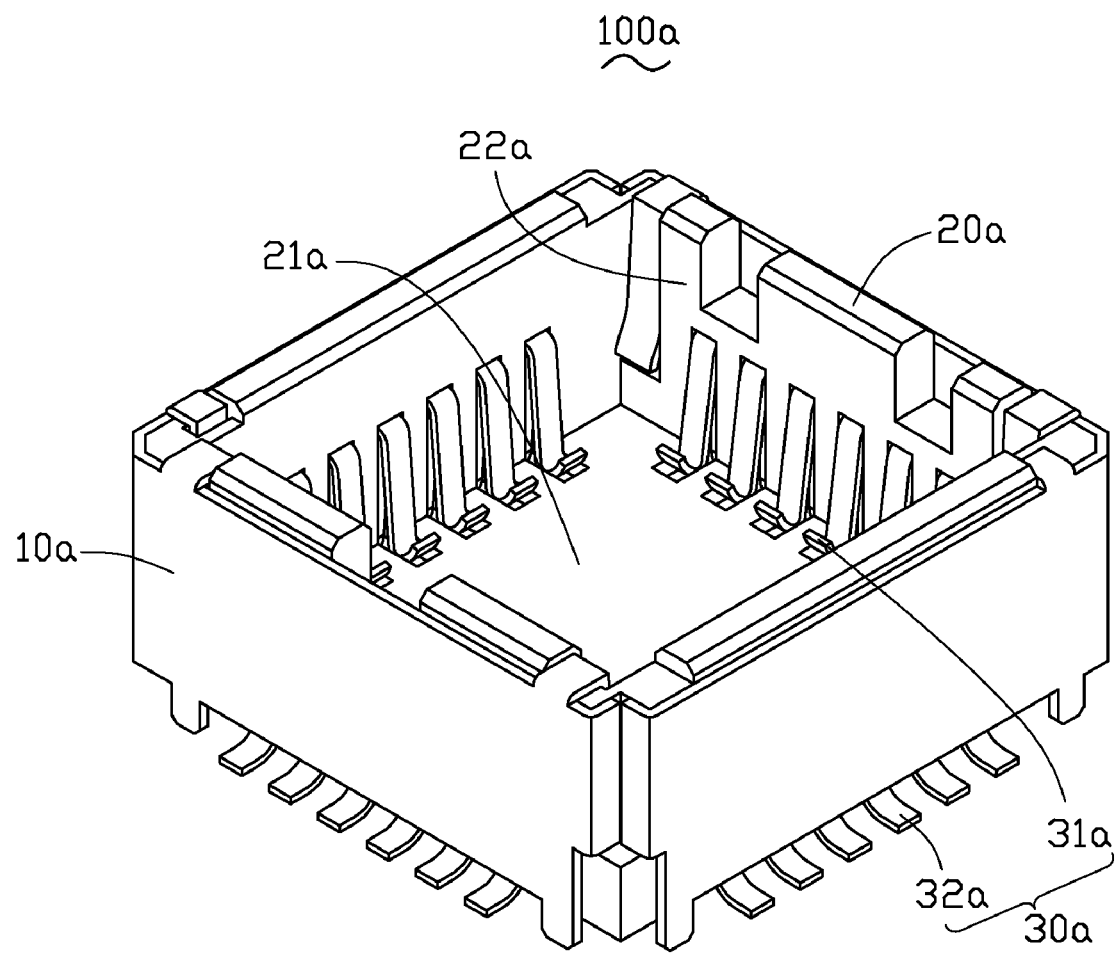
FIG. 4 is a schematic view of an electrical connector according to the related art.
Figure 5:
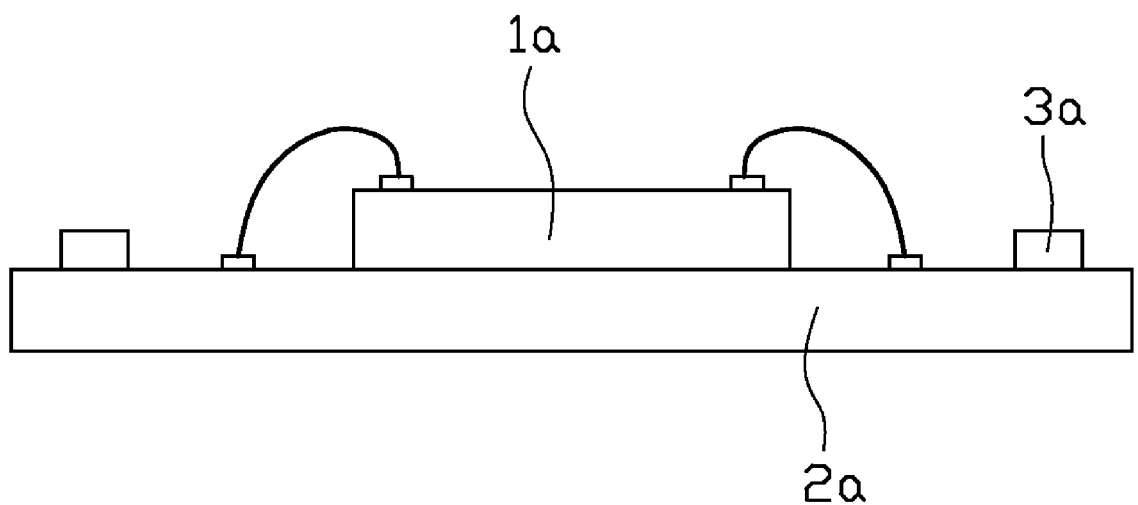
FIG. 5 is a schematic view of a base board of a camera module according to the related art.

Referring to FIG. 1, FIG. 2 and FIG. 3, a camera device 100 according to a preferred embodiment includes a camera module 10, an electrical connector 20 and a circuit board 30. The electrical connector 20 is mounted on the circuit board 30 for receiving the camera module 10 therein.

The camera module 10 includes a main body 12 and a substrate 11 such as a printed circuit substrate, disposed at the bottom of the camera module 10 for supporting the main body 12.

In present embodiment, at least one protrusion 121 is formed on the main body 12 of the camera module 10. Four gaps 122 are defined at four corners of the main body 12 of the camera module 10. The protrusion 121 and the gaps 122 are configured so as to allow the easy assemblage of the camera module 10 and the electrical connector 20.

An image sensor (not visible) of the camera module 10 is mounted on a surface of the substrate 11 facing to an object side of the camera module 10. At least one electronic element 112 (referring to FIG. 3) is mounted on a surface 111 of the substrate 11 facing away from the object side of the camera module 10. In present embodiment, three electronic elements 112 are mounted on the surface 111. The size of the substrate 11 can be minimized by mounting the image sensor and the electronic elements 112 on different surfaces of the substrate 11. The electronic elements 112 can be resistors and/or capacitors etc. The substrate 11 forms a number of contact pads (not visible) at the surface 111 configured for electrically connecting with the electrical connector 20.

The electrical connector 20 includes an insulative casing 22, a number of signal terminals 23 supported therein, and a metallic housing 21.

The insulative casing 22 is made of plastic and has a bottom wall 221 and four side walls 222 formed integrally with the bottom wall 221. A receiving space 223 is defined between the bottom wall 221 and the four side walls 222 of the insulative casing 22. The receiving space 223 is configured for receiving the camera module 10.

The four side walls 222 of the insulative casing 22 are formed with at least one cutout 2221 corresponding to the at least one protrusion 121 of the main body 12 of the camera module 10. The cutout 2221 and the protrusion 121 prevent the camera module 10 from being inserted with the wrong orientation when the camera module 10 is disposed into the receiving space 223. In present embodiment, two gaps 2222 are defined at two corners of the insulative casing 22 in order that the metallic housing 21 can be secured to the insulative casing 22 easily. The four side walls 222 of the insulative casing 22 each define a number of receiving grooves 2223.

The bottom wall 221 defines a receiving opening 2211 for receiving the electronic elements 112 mounted on the surface 111 of the substrate 11. The opening 2211 can penetrate through the bottom wall 221 or not penetrate through the bottom wall 221. The size and shape of the receiving opening 2211 can be designed according to the size and shape of electronic elements 112. The size of the receiving opening 2211 can be equal to the size of the bottom wall 221. In present embodiment, the receiving opening 2211 penetrates through the bottom wall 221 and is disposed at the center of the bottom wall 221.

The signal terminals 23 are made of a conductive and elastic material. Each signal terminal 23 includes a contact portion 231 and a bonding portion 232 at its two ends respectively. The signal terminals 23 are fixed, and preferably embedded in the receiving grooves 2223 of the insulative casing 22 respectively, so that the signal terminals 23 are assembled in the insulative casing 22. Each contact portion 231 of the signal terminals 23 extends into the receiving space 2223. While each bonding portion 232 extends beyond a bottom surface of the insulative casing 22 to outside of the casing 22. The bonding portions 232 may be soldered to corresponding contact pads on the circuit board 30 in order to electrically connect the electrical connector 20 with the circuit board 30.

The metallic housing 21 sheathes and wraps the insulative casing 20 for electro-magnetic interference (EMI) shielding. The shape and size of the metallic housing 21 essentially fit with the shape and size of the insulative casing 20. The metallic housing 21 has a number of bending portions 211 on the upper edge of the metallic housing 21. The bending portions 211 extend into the receiving space 2223 and hook the upper edge of the insulative casing 20. When the electrical connector 20 and the camera module 10 are assembled, the part of the bending portions 211 inside the insulative casing 20 can be received in the gaps 122 of the camera module 10. The metallic housing 21 also includes a number of grounding pins 212. The circuit board 30 defines a number of holes 31 corresponding to the grounding pins 212. The grounding pins 212 can be inserted respectively through the holes 31 to secure the electrical connector 20 and can ground the metallic housing 21.

In present embodiment, the circuit board 23 is a printed circuit board. When the height of the electronic elements 112 is too big to be received in the receiving opening 2211, a receiving cavity 32 can be defined in the circuit board 23 aligned with the receiving opening 2211. The receiving cavity 32 cooperates with the receiving opening 2211 for receiving the electronic elements 112. The receiving cavity 32 can penetrate through the circuit board 30 or not penetrate through the circuit board 30. In present embodiment, the receiving groove 32 penetrates through the circuit board 30 thus facilitating manufacturing of the circuit board 30.

In present embodiment, the electronic elements 112 mounted on the surface 111 of the substrate 11 can be received in the receiving opening 2211 of the bottom wall 221 of the electrical connector 20. Therefore, the electronic elements 112 and the image sensor of the camera module 10 needn't be mounted on the surface of the substrate 11 facing the object side of camera module 10. Accordingly, the size of the substrate 11 can be reduced and is agree with miniaturization request of camera device 100.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A camera device comprising:
 a circuit board defining a receiving cavity;
 a camera module having a substrate at the bottom thereof, at least one electronic element mounted on a surface of the substrate facing away from an object side of the camera module; and
 an electrical connector mounted on the circuit board for receiving the camera module therein, the electrical connector comprising:
  an insulative casing including a bottom wall and a plurality of side walls, a receiving space defined between the bottom wall and side walls for receiving the camera module, the bottom wall defining therein a receiving opening penetrating through the bottom wall for receiving the at least one electronic element of the camera module, the receiving opening being aligned with the receiving cavity of the circuit board; and
  a plurality of signal terminals fixed on the side walls and extending beyond the bottom wall configured for electrically connecting with the camera module and the circuit board.

2. The camera device as claimed in claim 1, wherein the insulative casing is made of plastic.

3. The camera device as claimed in claim 1, wherein the signal terminals are made of a conductive and elastic material.

4. The camera device as claimed in claim 1, wherein the electrical connector further comprises a metallic housing sheathing and wrapping the insulative casing thus acting as EMI shielding.

5. The camera device as claimed in claim 4, wherein the shape and size of the metallic housing essentially fit to the shape and size of the insulative casing.

6. The camera device as claimed in claim 4, wherein the metallic housing comprises a plurality of grounding pins electrically connecting with the circuit board for grounding.

7. The camera device as claimed in claim 1, wherein the camera module has at least one protrusion and the side walls of the insulative casing defines at least one cutout configured to receive the at least one protrusion.

8. The camera device as claimed in claim 1, wherein the receiving cavity of the circuit board penetrates through the circuit board.

9. A camera device comprising:
   a circuit board defining a receiving cavity;
   a camera module comprising a substrate with at least one electronic element mounted on a bottom surface of the substrate facing away from an object side of the camera module; and
   an electrical connector mounted on the circuit board for receiving the camera module therein, the electrical connector comprising an insulative casing having a bottom wall parallel to the circuit board and a plurality of side walls extending from the bottom wall, and a metallic housing attachably surrounding the insulative casing, a receiving space being defined between the bottom wall and side walls for receiving the camera module, the bottom wall defining therein a receiving opening penetrating through the bottom wall configured for receiving the at least one electronic element of the camera module, the receiving opening being aligned with the receiving cavity of the circuit board, a plurality of signal terminals fixed to the side walls in the receiving space and extending beyond the bottom wall configured for electrically connecting with the camera module and the circuit board.

* * * * *